United States Patent
Lin

(10) Patent No.: US 8,797,391 B2
(45) Date of Patent: Aug. 5, 2014

(54) STEREO IMAGE DISPLAYING METHOD

(75) Inventor: Chi-Chia Lin, Tainan County (TW)

(73) Assignee: Himax Media Solutions, Inc., Tainan (TW)

( * ) Notice: Subject to any disclaimer, the term of this patent is extended or adjusted under 35 U.S.C. 154(b) by 480 days.

(21) Appl. No.: 13/007,283

(22) Filed: Jan. 14, 2011

(65) Prior Publication Data

US 2012/0182287 A1   Jul. 19, 2012

(51) Int. Cl.
- H04N 13/02 (2006.01)
- H04N 13/00 (2006.01)
- H04N 13/04 (2006.01)

(52) U.S. Cl.
CPC ....... H04N 13/0434 (2013.01); H04N 13/0018 (2013.01); H04N 13/0436 (2013.01)
USPC ................... 348/58; 348/55; 348/56; 348/57; 348/59; 348/60

(58) Field of Classification Search
CPC .......... H04N 13/0018; H04N 13/0436; H04N 13/0434; H04N 13/0459; H04N 3/0059; H04N 13/0422; G02B 27/26
USPC ........................................................... 348/58
See application file for complete search history.

(56) References Cited

U.S. PATENT DOCUMENTS

| | | | | |
|---|---|---|---|---|
| 4,785,818 A | * | 11/1988 | Hardin | 600/443 |
| 5,214,504 A | * | 5/1993 | Toriu et al. | 375/240.02 |
| 5,293,456 A | * | 3/1994 | Guez et al. | 706/20 |
| 6,023,315 A | * | 2/2000 | Harrold et al. | 349/108 |
| 6,782,143 B1 | * | 8/2004 | Dube et al. | 382/300 |
| 7,058,252 B2 | * | 6/2006 | Woodgate et al. | 385/16 |
| 7,123,277 B2 | * | 10/2006 | Brown Elliott et al. | 345/690 |
| 7,153,653 B2 | * | 12/2006 | Goggins et al. | 435/6.12 |
| 7,227,568 B2 | * | 6/2007 | Sun et al. | 348/58 |
| 7,609,445 B2 | * | 10/2009 | Hamagishi | 359/463 |
| 7,646,537 B2 | * | 1/2010 | Shestak | 359/465 |
| 8,005,318 B2 | * | 8/2011 | Ou et al. | 382/298 |
| 8,134,591 B2 | * | 3/2012 | Marcus et al. | 348/54 |
| 8,240,854 B2 | * | 8/2012 | Krijn et al. | 353/8 |
| 8,284,241 B2 | * | 10/2012 | Shestak et al. | 348/51 |
| 8,339,444 B2 | * | 12/2012 | Schultz et al. | 348/54 |
| 8,659,641 B2 | * | 2/2014 | Brigham et al. | 348/42 |
| 2002/0015110 A1 | * | 2/2002 | Brown Elliott | 348/589 |
| 2002/0113195 A1 | * | 8/2002 | Osada | 250/208.1 |
| 2002/0118452 A1 | * | 8/2002 | Taniguchi et al. | 359/463 |
| 2002/0136308 A1 | * | 9/2002 | Le Maguet et al. | 375/240.25 |
| 2003/0112864 A1 | * | 6/2003 | Karczewicz et al. | 375/240.01 |
| 2003/0156203 A1 | * | 8/2003 | Kondo et al. | 348/222.1 |

(Continued)

*Primary Examiner* — Andy Rao
*Assistant Examiner* — Shan Elahi
(74) *Attorney, Agent, or Firm* — J.C. Patents

(57) ABSTRACT

A stereo image displaying method adapted to a polarizing panel is provided. The stereo image displaying method includes the following steps. An original first eye image and the original second eye image are received. Each of the odd pixel data rows of the original first eye image is interpolation operated with at least one of two adjacent even pixel data rows of original the first eye image to serve as one of a plurality of pixel data rows of a first eye image of a display frame. Each of the even pixel data rows of the original second eye image is interpolation operated with at least one of two adjacent odd pixel data rows of the original second eye image to serve as one of a plurality of pixel data rows of a second eye image of the display frame. The display frame is applied on the polarizing panel.

13 Claims, 1 Drawing Sheet

(56) References Cited

U.S. PATENT DOCUMENTS

| | | |
|---|---|---|
| 2003/0179953 A1* | 9/2003 | Ishizaka ................. 382/298 |
| 2003/0218683 A1* | 11/2003 | Kurase ................. 348/335 |
| 2005/0083246 A1* | 4/2005 | Saishu et al. ................. 345/1.1 |
| 2005/0225563 A1* | 10/2005 | Brown Elliott et al. ...... 345/604 |
| 2007/0085903 A1* | 4/2007 | Zhang ................. 348/58 |
| 2007/0115231 A1* | 5/2007 | Kumeta ................. 345/88 |
| 2008/0036853 A1* | 2/2008 | Shestak et al. ................. 348/51 |
| 2008/0303892 A1* | 12/2008 | Kim et al. ................. 348/42 |
| 2009/0002481 A1* | 1/2009 | Kim et al. ................. 348/42 |
| 2009/0052797 A1* | 2/2009 | Matsushita et al. ........... 382/260 |
| 2010/0118045 A1* | 5/2010 | Brown Elliott et al. ...... 345/589 |

* cited by examiner

STEREO IMAGE DISPLAYING METHOD

BACKGROUND

1. Field of the Invention

The invention relates to a stereo image displaying method. Particularly, the invention relates to a stereo image displaying method adapted to a polarizing panel.

2. Description of Related Art

Along with progress and development of technology, people increasingly pursue physical and spiritual enjoyments. Regarding the spiritual level, based on quick development of technology, people hope to implement their wild imaginations through stereo displays to achieve immersive effects. Therefore, how to present stereo images or frames through a stereo display is a goal to be achieved by today's stereo display techniques.

There are mainly two types of the stereo display technique at present, and one is a stereoscopic-type, which requires a user to wear a pair of specially designed glasses, and another one is an auto-stereoscopic type, which can be implemented through the user's naked eyes. The stereoscopic-type stereo display technique has been well developed, and is widely used in some special purposes such as military simulations or large-scale entertainments. Moreover, stereo displaying methods using polarizing glasses and shutter glasses are main streams of the current stereo techniques.

Since the shutter glasses alternately display left and right eye images, it may have a frame flicking phenomenon, which may cause visual fatigue after a long time utilization. Comparatively, the polarizing glasses display the left and right eye images through different polarized light, so that the frame flicking phenomenon is avoided. Therefore, utilization comfortableness of the polarizing glasses is higher than that of the shutter glasses, and cost the polarizing glasses is lower than that of the shutter glasses.

However, regarding the polarizing glasses, a polarizing panel thereof respectively display the left eye image and the right eye image through odd pixel rows and even pixel rows at the same time, and the odd pixel rows and the even pixel rows respectively display the images through different polarized light. Therefore, before the polarizing panel displays the left eye image and the right eye image, the left eye image and the right eye image are combined into a frame, and a conventional combining method thereof is to reserve pixel data to be displayed and abandon pixel data that is not to be displayed. However, abandoning of the pixel data that is not to be displayed may cause loss of a part of image information, so that some images (for example, text images or line images) cannot be clearly recognized.

SUMMARY OF THE INVENTION

The invention is directed to a stereo image displaying method, by which pixel data to be abandoned is interpolation-operated with pixel data to be displayed, so as to reserve image information of a whole left eye/right eye image, and accordingly improve quality of a stereo image.

The invention provides a stereo image displaying method adapted to a polarizing panel having a plurality of odd pixel row units and a plurality of even pixel row units. The odd pixel row units display a first eye image, and meanwhile the even pixel row units display a second eye image. The stereo image displaying method includes the following steps. An original first eye image and an original second eye image are received, where the original first eye image has a plurality of odd pixel data rows and a plurality of even pixel data rows, and the original second eye image has a plurality of odd pixel data rows and a plurality of even pixel data rows. Each of the odd pixel data rows of the original first image is interpolation-operated with at least one of two adjacent even pixel data rows of the original first image to serve as one of a plurality of pixel data rows of a the first eye image. Each of the even pixel data rows of the original second eye image is interpolation-operated with at least one of two adjacent odd pixel data rows of the original second eye image to serve as one of a plurality of pixel data rows of the second eye image. Then, the first eye image is combined with the second eye image to obtain a display frame. The display frame is applied on the polarizing panel to display the first eye image on the odd pixel row units and the second eye image on the even pixel row units.

In an embodiment of the invention, the step that each of the odd pixel data rows of the original first eye image is interpolation-operated with at least one of two adjacent even pixel data rows of the original first eye image includes that a first pixel data in the each of the odd pixel data rows of the original first eye image is interpolation-operated with one of a second pixel data and a third pixel data adjacent to the first pixel data, where the second pixel data and the third pixel data are respectively in different even pixel data rows of the original first eye image.

In an embodiment of the invention, the step that each of the odd pixel data rows of the original first eye image is interpolation-operated with at least one of two adjacent even pixel data rows of the original first eye image includes that a first pixel data in the each of the odd pixel data rows of the original first eye image is interpolation-operated with a second pixel data and a third pixel data adjacent to the first pixel data, where the second pixel data and the third pixel data are respectively in different even pixel data rows of the original first eye image.

In an embodiment of the invention, the step that each of the odd pixel data rows of the original first eye image is interpolation-operated with at least one of two adjacent even pixel data rows of the original first eye image includes that a first pixel data in the each of the odd pixel data rows of the original first eye image is interpolation-operated with a second pixel, a third pixel data, a fourth pixel data, a fifth pixel data, a sixth pixel data, a seventh pixel data, an eight pixel data and a ninth pixel data adjacent to the first pixel data, where the fourth pixel data and the fifth pixel data are adjacent to the first pixel data horizontally, the second pixel data and the third pixel data are adjacent to the first pixel data vertically, the sixth pixel data, the seventh pixel data, the eight pixel data and the ninth pixel data are adjacent to the first pixel data obliquely.

In an embodiment of the invention, the step that each of the even pixel data rows of the original second eye image is interpolation-operated with at least one of two adjacent odd pixel data rows of the original second eye image includes that a first pixel data in the each of the even pixel data rows of the original second eye image is interpolation-operated with one of a second pixel data and a third pixel data adjacent to the first pixel data, where the second pixel data and the third pixel data are respectively in different odd pixel data rows of the original second eye image.

In an embodiment of the invention, the step that each of the even pixel data rows of the original second eye image is interpolation-operated with at least one of two adjacent odd pixel data rows of the original second eye image includes that a first pixel data in the each of the even pixel data rows of the original second eye image is interpolation-operated with a second pixel data and a third pixel data adjacent to the first pixel data, where the second pixel data and the third pixel data are respectively in different odd pixel data rows of the original second eye image.

In an embodiment of the invention, a weight value of the first pixel data is WT1, and weight values of the second pixel data and the third pixel data are WT2, where WT1≥WT2.

In an embodiment of the invention, the step that each of the even pixel data rows of the original second eye image is interpolation-operated with at least one of two adjacent odd pixel data rows of the original second eye image includes that a first pixel data in the each of the even pixel data rows of the original second eye image is interpolation-operated with a second pixel, a third pixel data, a fourth pixel data, a fifth pixel data, a sixth pixel data, a seventh pixel data, an eight pixel data and a ninth pixel data adjacent to the first pixel data, where the fourth pixel data and the fifth pixel data are adjacent to the first pixel data horizontally, the second pixel data and the third pixel data are adjacent to the first pixel data vertically, the sixth pixel data, the seventh pixel data, the eight pixel data and the ninth pixel data are adjacent to the first pixel data obliquely.

In an embodiment of the invention, a weight value of the first pixel data is WT1, weight values of the second pixel data and the third pixel data are WT2, weight values of the fourth pixel data and the fifth pixel data are WT3, weight values of the sixth pixel data, the seventh pixel data, the eight pixel data and the ninth pixel data are WT4, where WT1≥WT2≥WT3≥WT4.

According to the above descriptions, in the stereo image displaying method of the invention, the odd pixel data row of the original first eye image is interpolation-operated with at least one of two adjacent even pixel rows of the original first eye image to generate the pixel data row of the first eye image of the display frame, and the even pixel data row of the original second eye image is interpolation-operated with at least one of two adjacent odd pixel rows of the original second eye image to generate the pixel data row of the second eye image of the display frame. In this way, when the first eye image and the second eye image are displayed through the polarizing panel, image information thereof is integral, so that a display quality is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
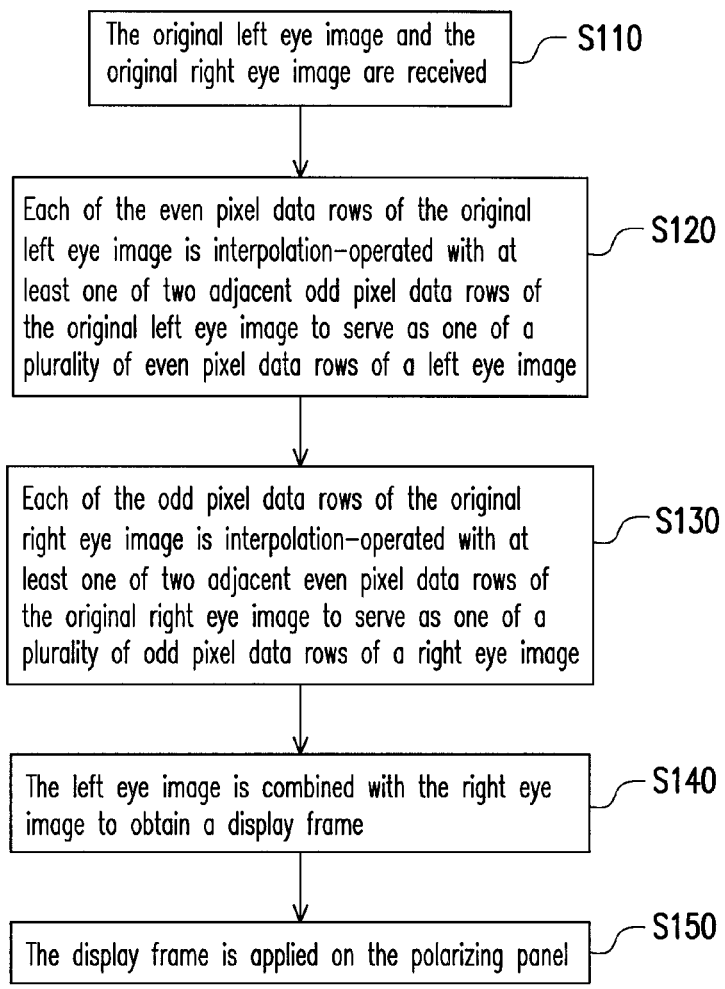
FIG. 1 is a flowchart illustrating a stereo image displaying method according to an embodiment of the invention.

FIG. 1 is a flowchart illustrating a stereo image displaying method according to an embodiment of the invention. Referring to FIG. 1, in the present embodiment, the stereo image displaying method is adapted to a polarizing panel having a plurality of odd pixel row units and a plurality of even pixel row units, where each of the odd pixel row units can be a odd pixel row of the polarizing panel, each of the even pixel row units can be a even pixel row of the polarizing panel. The odd pixel row units display one of a left eye image and a right eye image, and the even pixel rows display another one of the left eye image and the right eye image. Here, the left eye image is, for example, a horizontal polarized light image, and the right eye image is, for example, a vertical polarized light image, so that a left eye image and a right eye image are filtered by a polarizing glasses and respectively enter a left eye and a right eye of a user to form a stereo image. However, according different displaying methods, the left eye image can also be the vertical polarized light image, and the right eye image can be the horizontal polarized light image, which is not limited by the invention.

It is assumed that the even pixel row units of the polarizing panel display the left eye image, and the odd pixel row units of the polarizing panel display the right eye image, and the stereo image displaying method includes the following steps. First, an original left eye image and an original right eye image are received (step S110), where the original left eye image is processed to form the left eye image and has a plurality of even pixel data rows and a plurality of odd pixel data rows, and the original right eye image is processed to form the right eye image and also has a plurality of odd pixel data rows and a plurality of even pixel data rows.

Then, each of the even pixel data rows of the original left eye image is interpolation-operated with at least one of two adjacent odd pixel data rows of the original left eye image to serve as one of a plurality of pixel data rows of the left eye image displayed by the even pixel row units of the polarizing panel (step S120). Moreover, each of the odd pixel data rows of the original right eye image is interpolation-operated with at least one of two adjacent even pixel data rows of the original right eye image to serve as one of a plurality of pixel data rows of the right eye image displayed by the odd pixel row units of the polarizing panel (step S130). Next, the left eye image is combined with the right eye image to obtain a display frame (step S140). Here, the odd pixel data rows of the display frame are corresponded to the right eye image, the even pixel data rows of the display frame are corresponded to the left eye image.

Finally, the display frame is applied on the polarizing panel (step S140), so as to display the left eye image on even pixel row units of the polarizing panel and the right eye image on the odd pixel row units of the polarizing panel. According to the above descriptions, based on the interpolation operation, the even pixel data rows of the display frame contain all image information of the original left eye image, so that the displayed left eye image is relatively integral compared to that of a conventional technique, and a frame quality of the left eye image is higher than that of the conventional polarizing stereo displaying technique. On the other hand, based on the interpolation operation, the odd pixel data rows of the display frame also contain all image information of the original right eye image, so that the displayed right eye image is relatively integral compared to that of a conventional technique, and a frame quality of the right eye image is higher than that of the conventional polarizing stereo displaying technique.

Figure 2:
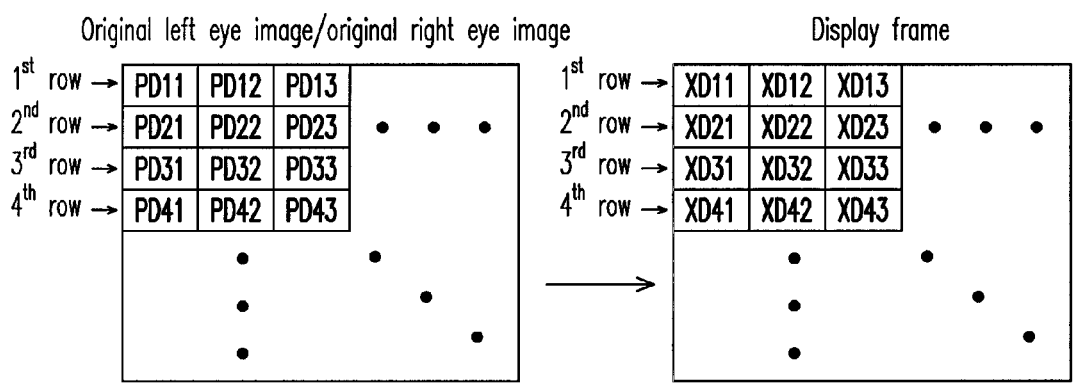
FIG. 2 is a schematic diagram of an original left eye image, an original right eye image and a display frame according to an embodiment of the invention.

FIG. 2 is a schematic diagram of an original left eye image, an original right eye image and a display frame according to an embodiment of the invention. Referring to FIG. 2, first, taking the original left eye image as an example, each of the even pixel data rows of the original left eye image is interpolation-operated with at least one of two adjacent odd pixel data rows of the original left eye image to serve as one of a plurality of even pixel data rows of the display frame (i.e. one of a plurality of pixel data rows of a left eye image).

Here, each of the even pixel data rows of the original left eye image is interpolation-operated with one of two adjacent odd pixel data rows of the original left eye image, i.e. the $2^{nd}$ pixel data row (i.e. pixel data PD21, PD22, PD23, ..., etc.) of the original left eye image is interpolation-operated with one of the $1^{st}$ pixel data row (i.e. pixel data PD11, PD12, PD13, ..., etc.) and the $3^{rd}$ pixel data row (i.e. pixel data PD31, PD32, PD33, ..., etc.) of the original left eye image to serve as the $2^{nd}$ pixel data row (i.e. pixel data XD21, XD22, XD23, ..., etc.) of the display frame, and the $4^{th}$ pixel data row (i.e. pixel data PD41, PD42, PD43, ..., etc.) of the original left eye image is interpolation-operated with one of the $3^{rd}$ pixel data row and the $5^{th}$ pixel data row (not shown) of the original left eye image to serve as the $4^{th}$ pixel data row (i.e. pixel data XD41, XD42, XD43, ..., etc.) of the display frame, and the others are deduced by analogy.

Further, the pixel data PD21 is interpolation-operated with the pixel data PD11 or the pixel data PD31 vertically adjacent to the pixel data PD21 to serve as the pixel data XD21 of the display frame, the pixel data PD22 is interpolation-operated with the pixel data PD12 or the pixel data PD32 to serve as the pixel data XD22 of the display frame, and the others are deduced by analogy. Taking the pixel data PD21 as an example, a method of the interpolation operation thereof is that a average of a gray value GR21 (i.e. a gray value of the pixel data PD21) and a gray value GR11 (i.e. a gray value of the pixel data PD11) or a gray value GR31 (i.e. a gray value of the pixel data PD21) serves as a gray value of the pixel data XD21. Considering integrity of the image information, the reserved integrity of the image information is relatively high when each of the even pixel row (for example, the $2^{nd}$ or the $4^{th}$ pixel data row) is interpolation-operated with an upper odd pixel data row (for example, the $1^{st}$ or the $3^{rd}$ pixel data row), i.e. the pixel data PD21 is interpolation-operated with the pixel data PD11, and the pixel data PD22 is interpolation-operated with the pixel data PD12, and the others are deduced by analogy.

Moreover, since in the original left eye image, the even pixel data rows are mainly counted, a weight value can be set to each pixel data, and then the interpolation operation is performed according to the weight values. For example, a weight value WT1 of the pixel data PD21 is set to 2, and weight values WT2 of the pixel data PD11 and PD31 are set to 1, so that the gray value of the pixel data XD21 is (GR21×2+GR11×1)/(2+1) or (GR21×2+GR31×1)/(2+1). In other embodiments, the weight value WT1 is greater than or equal to the weight value WT2, and when the weight value WT1 is equal to the weight value WT2, the interpolation operation method is the same to the aforementioned interpolation operation method.

On the other hand, each of the even pixel data rows of the original left eye image can be interpolation-operated with two adjacent odd pixel data rows of the original left eye image to serve as one of a plurality of the even pixel data rows of the display frame, i.e. the $2^{nd}$ pixel data row of the original left eye image is interpolation-operated with the $1^{st}$ pixel data row and the $3^{rd}$ pixel data row of the original left eye image to serve as the $2^{nd}$ pixel data row of the display frame, and the $4^{th}$ pixel data row of the original left eye image is interpolation-operated with the $3^{rd}$ pixel data row and the $5^{th}$ pixel data row of the original left eye image to serve as the $4^{th}$ pixel data row of the display frame, and the others are deduced by analogy.

Further, the pixel data PD21 is interpolation-operated with the pixel data PD11 and the pixel data PD31 to serve as the pixel data XD21 of the display frame, the pixel data PD22 is interpolation-operated with the pixel data PD12 and the pixel data PD32 to serve as the pixel data XD22 of the display frame, and the others are deduced by analogy. Taking the pixel data PD21 as an example, the gray value of the pixel data XD21 is (GR21+GR11+GR31)/3. Moreover, regarding a last even pixel data row, a number of the adjacent odd pixel data row is only one, so that the interpolation operation of the last even pixel data row and the adjacent odd pixel data row is similar to the aforementioned interpolation operation method in which one of the two adjacent odd pixel data rows is selected for interpolation.

Moreover, a weight value can also be set to each pixel data, and then the interpolation operation is performed according to the weight values. For example, a weight value WT1 of the pixel data PD21 is set to 2, and weight values WT2 of the pixel data PD11 and PD31 are also set to 1, so that the gray value of the pixel data XD21 is (GR21×2+GR11×1+GR31×1)/(2+1+1). In other embodiments, the weight value WT1 is greater than or equal to the weight value WT2, and when the weight value WT1 is equal to the weight value WT2, the interpolation operation method is the same to the aforementioned interpolation operation method.

Moreover, besides a one-dimensional manner, the interpolation operation can also be performed according to a two-dimensional manner, i.e. a matrix is used to perform the interpolation operation. Taking the pixel data PD22 as an example, a 3×3 matrix can be used to perform the interpolation operation, i.e. the pixel data PD22 is interpolation-operated with the pixel data PD12, PD32, the pixel data PD21, PD23, the pixel data PD11, PD13, PD31 and PD33 to serve as the pixel data XD22 of the display frame, where the pixel data PD12 and PD32 adjacent to the pixel data PD22 vertically, the pixel data PD21 and PD23 adjacent to the pixel data PD22 horizontally, the pixel data PD11, PD13, PD31 and PD33 adjacent to the pixel data PD22 obliquely. Accordingly, the gray value of the pixel data XD22 is (GR11+GR12+GR13+GR21+GR22+GR23+GR31+GR32+GR33)/9, where GR11–GR13, GR21–GR23 and GR31–GR33 are respectively gray values of the pixel data PD11–PD13, PD21–PD23 and PD31–PD33. Regarding the pixel data PD21, a 3×3 matrix cannot be obtained, so that a 3×2 matrix can be used or at least one of the two pixel data vertically adjacent to the pixel data PD21 can be used to perform the interpolation operation.

If a weight value is set to each pixel data, the interpolation operation can be performed according to the weight values. For example, a weight value WT1 of the pixel data PD22 is set to 4, weight values WT2 of the pixel data PD12 and PD32 are set to 2, weight values WT3 of the pixel data PD21 and PD23 are set to 1, and weight values WT4 of the pixel data PD11, PD13, PD31 and PD33 are set to 1, so that the gray value of the pixel data XD22 is (GR21×4+GR12×2+GR32×2+GR21×1+GR23×1+GR11×1+GR13×1+GR31×1+GR33×1)/(4+2+2+1+1+1+1+1+1). In other embodiments, the weight values WT1≥WT2≥WT3≥WT4, and when the weight values WT1, WT2, WT3 and WT4 are the same, the interpolation operation method is the same to the aforementioned interpolation operation method.

The above descriptions are made based on the original left eye image, and interpolation operations of the original right eye image are approximately same to that of the original left eye image, and a difference there between is that in the original right eye image, the odd pixel data rows are mainly counted. In other words, the $1^{st}$ pixel data row (i.e. the pixel data PD11, PD12, PD13, ..., etc.) of the original right eye image is interpolation-operated with the $2^{nd}$ pixel data row (i.e. the pixel data PD21, PD22, PD23, ..., etc.) of the original right eye image to serve as the 1st pixel data row (i.e. the pixel data XD11, XD12, XD13, ..., etc.) of the display frame, the 3rd pixel data row (i.e. pixel data PD31, PD32, PD33, ..., etc.) of the original right eye image is interpolation-operated with at least one of the 2nd pixel data row and the 4th pixel data row (i.e. pixel data PD41, PD42, PD43, ..., etc.) of the original right eye image to serve as the 3rd pixel data row (i.e. pixel data XD31, XD32, XD33, ..., etc.) of the display frame, and the others are deduced by analogy.

Moreover, in case that each of the odd pixel data rows is interpolation-operated with one of two adjacent even pixel data rows, the reserved integrity of the image information is relatively high when each of the odd pixel row (for example, the 1st or the 3rd pixel data row) of the original right eye image is interpolation-operated with a lower even pixel data row (for example, the 2nd or the 4th pixel data row), i.e. the pixel data PD11 of the original right eye image is interpolation-operated with the pixel data PD21 to serve as the pixel data XD11, and the pixel data PD12 of the original right eye image is interpolation-operated with the pixel data PD22 to serve as the pixel data XD12, and the others are deduced by analogy.

In case that each of the odd pixel data rows is interpolation-operated with two adjacent even pixel data rows, a number of the even pixel data row adjacent to the first odd pixel data row is only one, so that the interpolation operation of the first odd pixel data row and the adjacent even pixel data row is similar to the aforementioned interpolation operation method in which one of the two adjacent even pixel data rows is selected for interpolation.

Moreover, in the above descriptions, it is assumed that in the original left eye image, the even pixel data rows are mainly counted, and in the original right eye image, the odd pixel data rows are mainly counted, though in other embodiments, in the original left eye image, the odd pixel data rows can be mainly counted, and in the original right eye image, the even pixel data rows can be mainly counted, and the interpolation methods are accordingly exchanged, though the invention is not limited thereto.

In summary, in the stereo image displaying method of the invention, the original left eye image is interpolation-operated to generate the even pixel data rows of the display frame (i.e. a left eye image), and the original right eye image is interpolation-operated to generate the odd pixel data rows of the display frame (i.e. a right eye image). In this way, when the left eye image and the right eye image are displayed through the polarizing panel, image information thereof is integral, so that a display quality is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A stereo image displaying method, adapted to a polarizing panel having a plurality of odd pixel row units and a plurality of even pixel row units, the odd pixel row units displaying a first eye image, and meanwhile the even pixel row units displaying a second eye image, and the stereo image displaying method comprising:

receiving an original first eye image and an original second eye image, wherein the original first eye image has a plurality of odd pixel data rows and a plurality of even pixel data rows, and the original second eye image has a plurality of odd pixel data rows and a plurality of even pixel data rows;

each of the odd pixel data rows of the original first eye image being interpolation-operated with at least one of two adjacent even pixel data rows of the original first eye image to serve as one of a plurality of pixel data rows of the first eye image;

each of the even pixel data rows of the original second eye image being interpolation-operated with at least one of two adjacent odd pixel data rows of the original second eye image to serve as one of a plurality of pixel data rows of the second eye image;

combining the first eye image with the second eye image to obtain a display frame; and applying the display frame on the polarizing panel to display the first eye image on the odd pixel row units and the second eye image on the even pixel row units, wherein the step that each of the odd pixel data rows of the original first eye image being interpolation-operated with at least one of two adjacent even pixel data rows of the original first eye image comprises:

a first pixel data in the each of the odd pixel data rows of the original first eye image being interpolation-operated with at least one of a second pixel data and a third pixel data adjacent to the first pixel data, wherein the step that each of the even pixel data rows of the original second eye image being interpolation-operated with at least one of two adjacent odd pixel data rows of the original second eye image comprises:

a first pixel data in the each of the even pixel data rows of the original second eye image being interpolation-operated with at least one of a second pixel data and a third pixel data adjacent to the first pixel data.

2. The stereo image displaying method as claimed in claim 1, wherein the step that each of the odd pixel data rows of the original first eye image being interpolation-operated with at least one of two adjacent even pixel data rows of the original first eye image comprises:

the first pixel data in the each of the odd pixel data rows of the original first eye image being interpolation-operated with one of the second pixel data and the third pixel data adjacent to the first pixel data, wherein the second pixel data and the third pixel data are respectively in the different even pixel data rows of the original first eye image.

3. The stereo image displaying method as claimed in claim 2, wherein a weight value of the first pixel data is WT1, and weight values of the second pixel data and the third pixel data are WT2, wherein WT1≥WT2.

4. The stereo image displaying method as claimed in claim 1, wherein the step that each of the odd pixel data rows of the original first eye image being interpolation-operated with at least one of two adjacent even pixel data rows of the original first eye image comprises:

the first pixel data in the each of the odd pixel data rows of the original first eye image being interpolation-operated with the second pixel data and the third pixel data adjacent to the first pixel data, wherein the second pixel data and the third pixel data are respectively in the different even pixel data rows of the original first eye image.

5. The stereo image displaying method as claimed in claim 4, wherein a weight value of the first pixel data is WT1, and weight values of the second pixel data and the third pixel data are WT2, wherein WT1≥WT2.

6. The stereo image displaying method as claimed in claim 1, wherein the step that each of the odd pixel data rows of the original first eye image being interpolation-operated with at least one of two adjacent even pixel data rows of the original first eye image comprises:

the first pixel data in the each of the first pixel data rows of the original first eye image being interpolation-operated with the second pixel data, the third pixel data, a fourth pixel data, a fifth pixel data, a sixth pixel data, a seventh pixel data, an eight pixel data and a ninth pixel data adjacent to the first pixel data, wherein the fourth pixel data and the fifth pixel data are adjacent to the first pixel data horizontally; the second pixel data and the third pixel data are adjacent to the first pixel data vertically; the sixth pixel data, the seventh pixel data, the eight pixel data and the ninth pixel data are adjacent to the first pixel data obliquely.

7. The stereo image displaying method as claimed in claim 6, wherein a weight value of the first pixel data is WT1, weight values of the second pixel data and the third pixel data are WT2, weight values of the fourth pixel data and the fifth pixel data are WT3, weight values of the sixth pixel data, the seventh pixel data, the eight pixel data and the ninth pixel data are WT4, wherein WT1≥WT2≥WT3≥WT4.

8. The stereo image displaying method as claimed in claim 1, wherein the step that each of the even pixel data rows of the original second eye image being interpolation-operated with at least one of two adjacent odd pixel data rows of the original second eye image comprises:

the first pixel data in the each of the even pixel data rows of the original second eye image being interpolation-operated with one of the second pixel data and the third pixel data adjacent to the first pixel data, wherein the second pixel data and the third pixel data are respectively in the different odd pixel data rows of the original second eye image.

9. The stereo image displaying method as claimed in claim 8, wherein a weight value of the first pixel data is WT1, and weight values of the second pixel data and the third pixel data are WT2, wherein WT1≥WT2.

10. The stereo image displaying method as claimed in claim 1, wherein the step that each of the even pixel data rows of the original second eye image being interpolation-operated with at least one of two adjacent odd pixel data rows of the original second eye image comprises:

the first pixel data in the each of the even pixel data rows of the original second eye image being interpolation-operated with the second pixel data and the third pixel data adjacent to the first pixel data, wherein the second pixel data and the third pixel data are respectively in the different odd pixel data rows of the original second eye image.

11. The stereo image displaying method as claimed in claim 10, wherein a weight value of the first pixel data is WT1, and weight values of the second pixel data and the third pixel data are WT2, wherein WT1≥WT2.

12. The stereo image displaying method as claimed in claim 1, wherein the step that each of the even pixel data rows of the original second eye image being interpolation-operated with at least one of two adjacent odd pixel data rows of the original second eye image comprises:

the first pixel data in the each of the even pixel data rows of the original second eye image being interpolation-operated with the second pixel data, the third pixel data, a fourth pixel data, a fifth pixel data, a sixth pixel data, a seventh pixel data, an eight pixel data and a ninth pixel data adjacent to the first pixel data, wherein the fourth pixel data and the fifth pixel data are adjacent to the first pixel data horizontally; the second pixel data and the third pixel data are adjacent to the first pixel data vertically; the sixth pixel data, the seventh pixel data the eight pixel data and the ninth pixel data are adjacent to the first pixel data obliquely.

13. The stereo image displaying method as claimed in claim 12, wherein a weight value of the first pixel data is WT1, weight values of the second pixel data and the third pixel data are WT2, weight values of the third pixel data and the fourth pixel data are WT3, weight values of the sixth pixel data, the seventh pixel data, the eight pixel data and the ninth pixel data are WT4, wherein WT1≥WT2≥WT3≥WT4.

* * * * *